Figure 1:
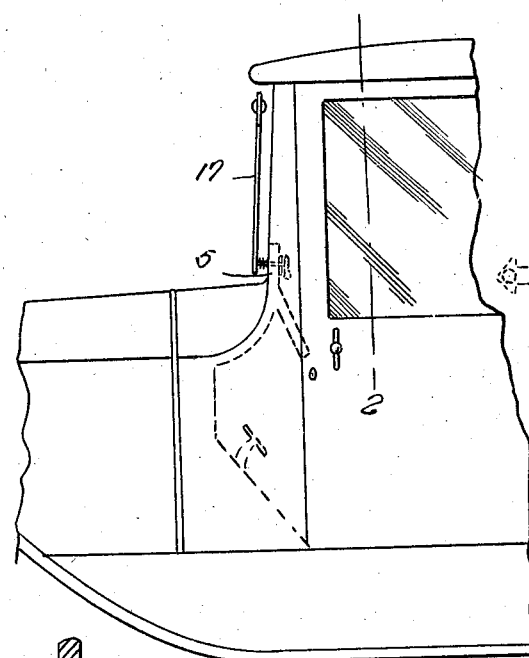

Feb. 22, 1927.

G. DAWKINS 1,618,580

SAFETY SIGNAL

Filed Jan. 30, 1926

Inventor
G. Dawkins,

By *Clarence A. O'Brien*

Attorney

Patented Feb. 22, 1927.

1,618,580

UNITED STATES PATENT OFFICE.

GEORGE DAWKINS, OF SHAVERTOWN, PENNSYLVANIA.

SAFETY SIGNAL.

Application filed January 30, 1926. Serial No. 84,947.

The present invention relates to a signal designed for automobiles and like vehicles, and has for its principal object to provide a signal of this nature which may be readily attached to an automobile, and easily operated for indicating right and left hand turns and stop signals.

Another very important object of the invention is to provide a signal of this nature which is exceedingly simple in its construction, durable, compact, convenient, easy to assemble and disassemble, not likely to easily become out of order, and otherwise well adapted to the purpose for which it is designed.

With the above and numerous other objects in view as will appear as the description proceeds, the invention resides in certain novel features of construction, and in the combination and arrangement of parts, as will be hereinafter more fully described and claimed.

In the drawing:—

Figure 2:
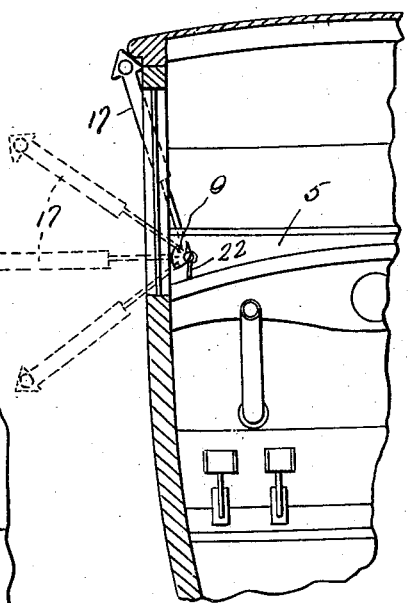
Figure 3:
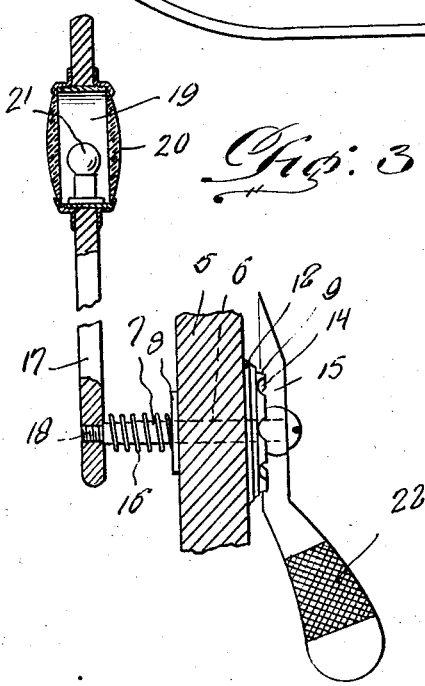
Figure 4:
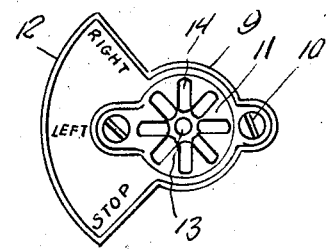

Figure 1 is a fragmentary side elevation of an automobile body showing my improved signal associated therewith, Fig. 2 is a transverse section taken substantially on the line 2—2 of Fig. 1, Fig. 3 is an enlarged detail section, and Fig. 4 is a plan view of one of the brackets.

Referring to the drawing in detail, it will be seen that 5 designates the front board of an automobile body of the closed type, although the same may indicate a similar portion of an automobile body of the open type. This portion 5 is provided with an opening 6 in which is slidably and rotatably mounted a shaft 7. A plate 8 is disposed on the outside of the portion 5 while a bracket 9 is disposed on the inside thereof, being held in place by screws 10. The bracket 9 includes a substantially circular body portion 11, and a segmental section or extension 12 which is substantially fan-shaped.

An aperture 13 is provided centrally of the body portion 11, and registers with the opening 6 for receiving the shaft 7. A plurality of notches 14 radiate from the center aperture 13. On the extension 12, there is situated such indicia as the word "Right", "Left", and "Stop". These words are printed or written in alinement with the notches 14 adjacent the extension 12. A bar 15 is fixed to the inner end of the shaft 7 in any suitable manner, and is adapted to engage in pairs of the notches 14 being held normally in said notches by a spring 16 on the outer end of the shaft 7, said spring impinging against the plate 8, and against an arm 17 threadedly engaged as at 18 on the outer end of the shaft 7.

This arm 17 has incorporated in its outer end a casing 19 having transparencies 20 and a source of illumination 21 therebetween. A handle 22 extends angularly from the bar 15. It will thus be seen that by operation of the handle 22, the signal arm 17 may be placed in any of the positions shown in Fig. 2. The position shown in dotted lines at R, L, and S, denote the right turn, left turn, and stop indicating positions respectively.

From the above description it will be seen that I have devised a signal which is capable of being easily assembled and disassembled in relation to its own parts and in relation to the body of the automobile. The structure is exceedingly simple and therefore may be manufactured at a low cost. The structure further allows convenient and easy manipulation so that the signal arm may be placed in the various desired positions. The bar 15 holds the signal in any position in which it may be placed against accidental displacement, and also functions as a pointer with respect to the indicia provided on the extension 12.

It is to be noted that the handle 21 and the bar 15 and the cooperating indicia on the extension 12 are located immediately in front of the driver, so that he can actuate the signal conveniently without the necessity of watching the signal arm. This insures of accuracy and eliminates the necessity of the driver taking his attention off of the situation immediately in front of him.

The present embodiment of the invention has been disclosed in detail, since in actual practice, it attains the features of advantage enumerated as desirable in the statement of the invention and the above description.

It will be apparent, however, that numerous changes in the details of construction, and in the combination and arrangement of parts may be resorted to without departing from the spirit or scope of the invention as hereinafter claimed, or sacrificing any of its advantages.

Having thus described my invention, what I claim as new is:

A signal for vehicles; wherein a support is provided with an opening; comprising a bracket on the one side of the support provided with an aperture registering with the opening of said support, said bracket provided with a plurality of notches arranged in pairs, the notches of each pair being on diametrically opposite sides of the opening of the bracket, an extension on the bracket having indicia aligned with the adjacent notches, a shaft journaled through said aperture and said opening, a bar, means for attaching an intermediate portion of the bar on the inner end of the shaft so that said bar will cooperate with the notches in pairs, a handle extending angularly from the bar and a signal arm on the shaft.

In testimony whereof I affix my signature.

GEORGE DAWKINS.